Patented May 12, 1925.

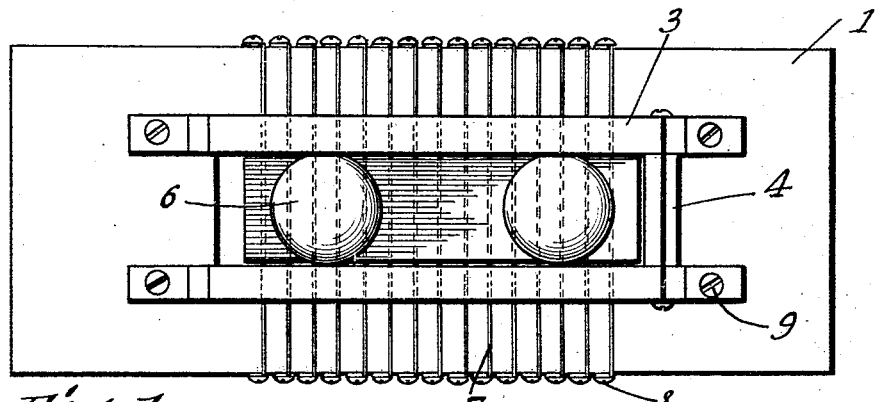
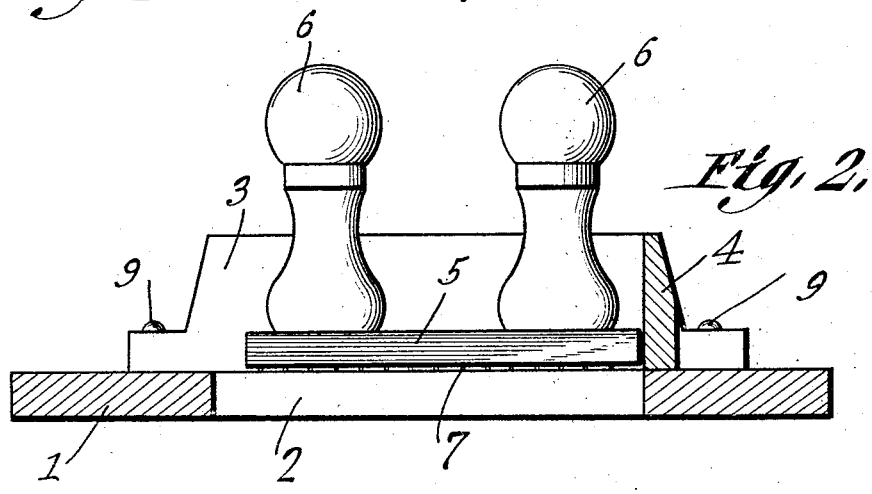
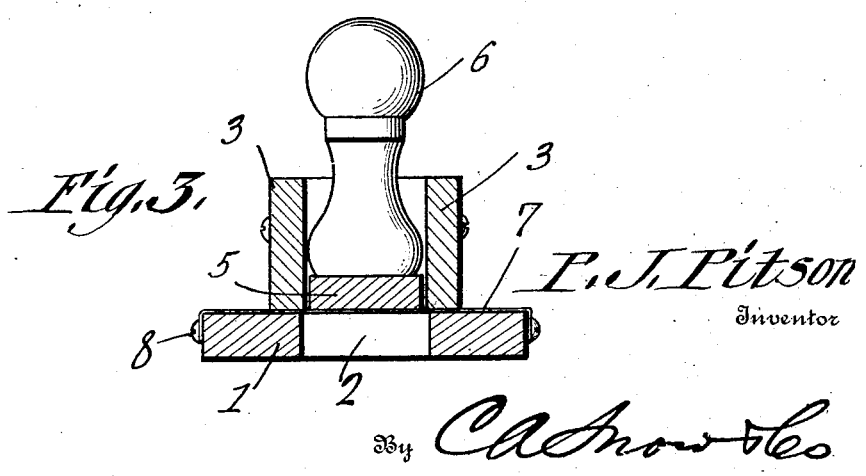

1,537,372

UNITED STATES PATENT OFFICE.

PETER J. PITSON, OF PERRYSBURG, OHIO.

BUTTER CUTTER.

Application filed June 14, 1924. Serial No. 719,995.

*To all whom it may concern:*

Be it known that I, PETER J. PITSON, a citizen of the United States, residing at Perrysburg, in the county of Wood and State of Ohio, have invented a new and useful Butter Cutter, of which the following is a specification.

This invention relates to a device for cutting butter, one of the objects of the invention being to provide a simple and efficient structure which can be cheaply manufactured, easily cleaned, and which will reduce a cake or print of butter quickly into small portions.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings—

Figure 1 is a plan view of the device.

Fig. 2 is a central longitudinal section therethrough.

Fig. 3 is a central transverse section.

Referring to the figures by characters of reference 1 designates a base provided with an opening 2 extending longitudinally thereof and which is of substantially the same area as the brick or print of butter to be cut. Secured on the base so as to project upwardly from the sides of the opening 2 are the side walls 3 of a holder and these side walls are connected at one end by an interposed end wall 4. The side and end walls cooperate to form a guide for a plunger 5 so proportioned as to work upwardly and downwardly between the side walls and above the opening 2. This plunger is provided with one or more handles 6 whereby it can be manipulated conveniently.

Cutters in the form of parallel wires 7 are stretched across the opening 2 and rest upon the top of the base 1, these wires being extended transversely under the side walls 3 having their ends downturned and secured to screws, studs or other projections on the sides of the base 1 and which have been indicated at 8.

In using this device the base 1 is placed over a pan or other container and the print or brick of butter to be cut is inserted between the walls 3 and against the wall 4. The plunger 5 is then placed upon the print or brick and forced downwardly. This will cause the butter to push between and past the wire 7 and said wires will thereby act to cut the butter into separate pieces which will fall through the opening 2 into the container provided.

It will be seen that the device is very simple in construction and can be cleaned readily. The end wall 4 is secured to the side walls and by removing the screws 9 used for attaching the side walls and the base the parts can be readily separated for cleaning and repairing. Without removing the walls 3 and 4 it is still possible to readily clean the structure so that it can be kept in a sanitary condition.

What is claimed is:—

A butter cutter including a base having an opening, separate cutting wires stretched across the opening, means engaging the ends of the respective wires for fastening the wires to the base, walls detachably mounted on the base at the sides of the opening and cooperating with the base to clamp the wires at intermediate points, an end wall interposed between and clamped by the first named walls and flush with one end wall of the opening, an elongated plunger between and guided by the side walls and the end wall, and separate handles upstanding from the end portions of the plunger.

In testimony that I claim the foregoing as my own, I have hereto affixed my signature in the presence of two witnesses.

PETER J. PITSON.

Witnesses:
 BERT KINSLEY,
 GEO. J. MUNGER.